United States Patent
Degenaro et al.

(10) Patent No.: US 7,490,105 B2
(45) Date of Patent: Feb. 10, 2009

(54) EXTERNALIZED SELECTION MIDDLEWARE FOR VARIABILITY MANAGEMENT

(75) Inventors: Louis R. Degenaro, White Plains, NY (US); Achille B. Fokoue-Nkoutche, White Plains, NY (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 10/941,789

(22) Filed: Sep. 15, 2004

(65) Prior Publication Data

US 2006/0059454 A1 Mar. 16, 2006

(51) Int. Cl.
*G06F 17/30* (2006.01)
(52) U.S. Cl. .............. 707/104.1; 707/1; 707/3; 707/100; 707/101; 707/103 R
(58) Field of Classification Search .......... 707/1–3, 707/100–104.1
See application file for complete search history.

(56) References Cited

U.S. PATENT DOCUMENTS

| | | | |
|---|---|---|---|
| 5,136,523 A | 8/1992 | Landers | |
| 5,826,250 A | 10/1998 | Trefler | |
| 6,247,056 B1* | 6/2001 | Chou et al. | 709/229 |
| 6,301,581 B1* | 10/2001 | Smiley | 707/103 R |
| 6,341,369 B1 | 1/2002 | Degenaro et al. | |
| 2002/0103661 A1 | 8/2002 | Albazz et al. | |
| 2002/0107843 A1* | 8/2002 | Biebesheimer et al. | 707/3 |
| 2002/0120917 A1 | 8/2002 | Abrari et al. | |
| 2003/0056201 A1* | 3/2003 | Degenaro et al. | 717/130 |
| 2004/0255275 A1* | 12/2004 | Czerwonka | 717/124 |

FOREIGN PATENT DOCUMENTS

WO WO02/086739 10/2002

OTHER PUBLICATIONS

U.S. Appl. No. 10/725,352, filed Dec. 1, 2003, Rouvellou et al, IBM Application.

* cited by examiner

*Primary Examiner*—Cam-Linh Nguyen
(74) *Attorney, Agent, or Firm*—Keusey, Tutunjian & Bitetto, P.C.; Joseph Jones

(57) ABSTRACT

A system and method for dynamically selecting logical operations using external criteria, includes providing tools for defining a selection criteria set having parameters including dimensions and valid values, wherein the selection criteria set includes a plurality of different arrangements and values of the parameters. The selection criteria set and collections of instances thereof are persistently maintained. A trigger is provided at runtime to query the persistently maintained instances to automatically select a logic operation to employ based upon a context of the query.

45 Claims, 7 Drawing Sheets

400

600

Trigger Mapping Table 611  612

610

| Trigger Id | Operation Id |
|---|---|
| t1 | op1 |
| t2 | op2 |
| t3 | op2 |
| t4 | op1 |

FIG.6

EXTERNALIZED SELECTION MIDDLEWARE FOR VARIABILITY MANAGEMENT

BACKGROUND OF THE INVENTION

1. Field of the Invention

The present invention relates generally to distributed application systems, and more specifically, to methods and systems for selection and employment of services based upon separable, externalized criteria.

2. Description of the Related Art

Much effort is continuously expended in making computer hardware and software more usable by those who are not computer experts. As resources (memory, CPU speed, engineering and programming skills) have become more plentiful, computers became more prolific and usable by non-technicians.

Selection of services, for example, web services, business rules, hardware functions, or other computer executable logic cells, is normally embedded within programs. As such, access, control, and all management aspects of selection criteria have been limited to or required the assistance of programmers or engineers. Further, the separation and externalization of selectivity criteria from evaluation criteria has not been obvious, though once achieved many benefits are realized.

A business may employ different discount logic cells based upon ever changing requirements, and at one point in time the discount logic employed may be based upon geographic location (for example, "north" and "south") and disposable income level. Recognition of geography as selection criteria and determination and use of disposable income level as evaluation criteria should be made first. Later, it may be decided that the geographies set should additionally include "east" and "west", which would normally require programming or engineering skills to re-implement. More desirable would be to facilitate the addition, deletion, or replacement of the geographies set utilized in logic cell selection without requiring intervention from programmers or engineers.

Previous work provided the capability to externalize the selection mechanism through custom programmer-crafted or user-specified parameterized code fragments together with an externalization framework. See e.g., U.S. Patent Application 20030056201 entitled "System and Method for Employing Externalized, Dynamically Configurable, Cacheable Trigger Points," to Degenaro et al., filed Sep. 20, 2001, and U.S. Patent Application YOR920030519US1 entitled "Methods and Apparatus for Business Rules Authoring and Operation Employing a Customizable Vocabulary" to Rouvellou et al., filed Dec. 1, 2003, commonly assigned and both incorporated herein by reference.

SUMMARY OF TEE INVENTION

The present invention recognizes that a vast majority of selections can be performed using a single selection algorithm based upon runtime inputs and externalized selection criteria. Therefore, it would be advantageous to provide a general purpose middleware that: facilitates the separation of selection criteria from evaluation criteria of computer executable cells; externalizes selection criteria management; and obviates the need for highly skilled technologists with respect to selection criteria, transferring management responsibilities thereof directly into the hands of interested parties.

A system and method for dynamically selecting logical operations using external criteria, includes providing tools for defining a selection criteria set having parameters including dimensions and valid values, wherein the selection criteria set includes a plurality of different arrangements and values of the parameters. The selection criteria set and collections of instances thereof are persistently maintained. A trigger is provided at runtime to query the persistently maintained instances to automatically select a logic operation to employ based upon a context of the query.

A system and method for dynamically selecting and triggering a function utilizing externalized criteria, includes the steps of defining a schema prescribing a selection criteria set comprising: an operation identity, a corresponding function identity, including evaluation parameter names and types and selection parameters, including names of, types of, and constraints over the selection parameters. A step of deriving a tool from the schema that facilitates: persistently defining and maintaining externalized selection criteria set instances; and creating trigger mechanism instances based upon evaluation parameters and operation identity is included.

The tool is employed to produce at least one externalized criteria set instance and at least one trigger mechanism. An improved application is deployed incorporating at least one trigger mechanism. A trigger mechanism is executed to dynamically select a function according to runtime context, which comprises a desired operation identity instance and corresponding selection parameters instances. The selected function is executed in accordance with runtime instances of corresponding evaluation parameters.

A system and method for dynamically selecting logical operations using external criteria includes defining a selection criteria set having parameters including dimensions and valid values. The selection set may include a plurality of different arrangements and values of the parameters. Based on the parameters defined, the selection criteria set is mapped to a logic operation wherein the mapping is dynamically influenced by the parameters in the selection criteria set. The logic operation may then be deployed and executed.

A method and system for dynamically selecting logical operations utilizing externalized criteria may include persistently maintaining at least one selection criteria set, persistently maintaining at least one corresponding logical operation, employing the at least one selection criteria set to retrieve exactly one logical operation, and employing a corresponding logical operation implementation.

Other methods and systems may include employing the retrieved logical operation to dynamically select another logical operation. The at least one selection criteria set may define the dimensions of the selection context, limited by the capacity of the chosen persistence mechanism, and express a complete and unambiguous conjunction of valid values for each dimension. The at least one selection criteria set may include a range, an enumeration and/or a combination thereof.

In other embodiments, for inputs and outputs, the at least one selection criteria set may employ simple data types, and the corresponding logical operation may employ one of simple data types, complex data types, and a combination thereof. The at least one selection criteria set and the corresponding logical operation may employ one of common inputs, unrelated inputs, and/or a combination thereof; and common outputs, unrelated outputs, and/or a combination thereof.

In still other embodiments, persistent maintenance for diverse selection criteria sets may be achieved utilizing a simple application-programming interface. At least one of a generic maintenance utility tool and an externalized data-driven generated custom maintenance utility tool may be employed in the simple application programming interface to present a tabular-oriented user interface preferably geared towards non-programmers. The persistence mechanism, which may be employed, may include a database, an Enterprise Java Bean (EJB), extensible Markup Language (XML), XML Metadata Interchange (XMI), and/or another standards-based persistence mechanism or a combination thereof.

The at least one selection criteria set may be expressed using a Structured Query Language (SQL), an Enterprise Java Bean Query Language (EJBQL), XML, XMI, and/or another standards based language or a combination thereof. The corresponding query systems are preferably employed to interrogate externalized data to formulate a conjunction that results in identification of a specified logical operation.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 6 is a diagram showing an additional trigger mapping implementation example according to one embodiment of the present invention.

DETAILED DESCRIPTION OF PREFERRED EMBODIMENTS

Figure 1:
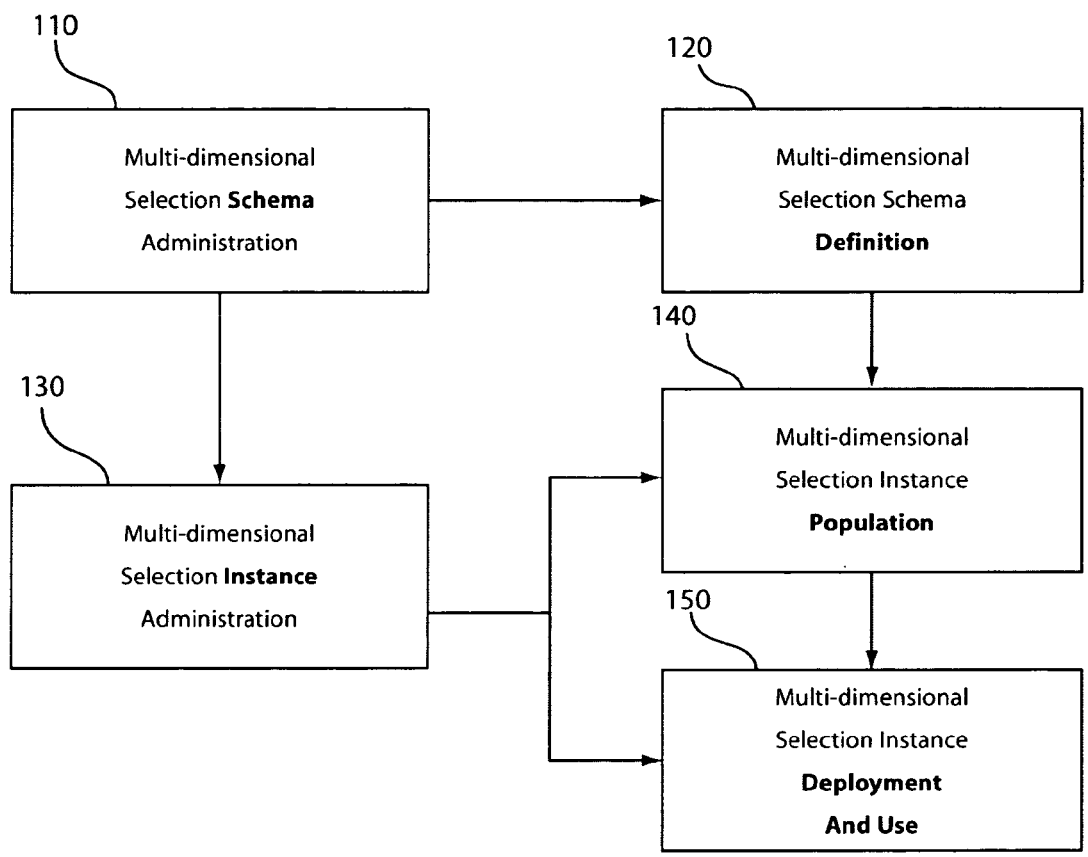
FIG. 1 is a block/flow diagram showing multi-dimensional externalized selection middleware components according to one embodiment of the present invention.

The present invention empowers those not necessarily skilled in the art of computer programming to easily command and control computer applications. One key technical innovation of the present invention is the implementation of a middleware comprising a generic program code fragment that satisfies a large majority of multi-dimensional selections using a small fixed number of database tables, allowing non-programmers to manipulate diverse applications with a common user interface.

In one preferred embodiment of the present invention, applications of the past are modernized such that, for example, embedded "business" logic is replaced by one or more trigger points. A trigger point is an appeal to an external authority for the performance of formerly embedded business logic. The external authority employs a corresponding logic cell to carry out the now externalized business logic. For example, an old fashioned application may have embedded business logic to calculate an insurance quote based upon an algorithm that considers, e.g., "marital status" and "occupation". A modern application would instead have a trigger point that appeals to an external business logic authority for an "insurance quote" relative to a context including the evaluation criteria "marital status" and "occupation".

The present invention may be distinguished from the prior art in that externalized selection criteria are applied to choose an algorithm (or logic cell). For example, when a trigger point appeals for an "insurance quote", selection criteria such as "age" and "state" may be considered just to select the logic cell to be applied. When the "age" is greater than 50 and the "state" is NY then the "insurance quote" algorithm to apply to the evaluation criteria is "ratequote1", whereas when the age is less than or equal to 50 and the state is NY then the "insurance quote" algorithm to apply to the evaluation criteria is "ratequote2". The algorithm selection mechanism is one significant advantage of the present invention. Note that the selection criteria ("age", "state") need not intersect with the evaluation criteria ("marital status", occupation").

Further, the present invention may be distinguished from the prior art in that the externalized selection criteria can be partially or completely specified by a target audience, for example, insurance company actuaries or business managers, and not just programmers or engineers. These non-technicians can specify selection criteria using their own vocabulary. These selection criteria are then transformed into computer executable code employed at runtime to choose the appropriate logic cell (e.g., "ratequote1" or "ratequote2"). The externalized selection criteria can be updated and changed dynamically during runtime. For example, an insurance company actuary may decide to add an additional selection criteria "gender" to the existing selection criteria of "age" and "state".

The present invention enables non-programmers to implement conditional selection behaviors while still in accordance with existing programming models and tools. The presently disclosed embodiments extend the audience for middleware solutions by reaching out to non-information technology personnel, which builds upon previous work related to externalization, and minimizes initial investment needed by enabling re-use of existing code bases without modification. In addition, the present invention permits for application selection-influenced behavioral and content changes to be dynamically effective (e.g., without restarting) at minimal cost in terms of performance and instrumentation. Further, the present invention eases the management of externalized logic by allowing, in many cases, verification and/or enforcement of very commonly desired global properties over a set of externalized logic cells. For example, in the previous insurance scenario, one could verify that rate quote algorithms exist for all the states the insurance is covering.

Preferred embodiments of the present invention may include one or more of the following relative features and aspects. In preferred embodiments, the number of database tables is preferably small (e.g., three); the number of selection types supported is reasonable; selections based on ranges are possible; separate contexts for selection and evaluation may be utilized. In other embodiments, the number of custom selections covered is large; the amount of customized code that needs to be created for tabular selection is zero; a simple tabular-display-like tool can be used to manipulate any selection group; and selection completeness and consistency algorithms can be applied. In the unusual case where table-based selection is insufficient, any externalized function can be invoked to perform the selection; and selection chaining is supported. These and other benefits result from the teachings of the preferred embodiments of the present invention.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces.

The present invention comprises tools and middleware to facilitate externalized selection by non-technicians. The tools assist non-technicians in specifying schemas (e.g., tables or other data structures (XML, XMI, etc.)) for and instances of selection criteria. The basic steps and artifacts are now discussed, though one skilled in the art can appreciate that once a bootstrap set of artifacts is in place, updates can be applied in iterative fashion.

Tools to create a schema can be employed by non-technicians to define the dimensions of a selection. Such tools may comprise, for example, a graphical user interface (GUI) that provides pull down menus or similar well-known hardware and software for selecting criteria (e.g., "age" and "state") from a list of possible choices as the selection criteria dimensions desired for the schema.

Further, the GUI may allow a non-technician to specify the type and valid values for each dimension of the schema, such as, e.g., type=integer and valid values=(0-100) for "age"; and type=string and valid values=(NY, NJ, CT) for "state", again via well known devices and software. The choices may be extracted from one or more known contexts relative to application trigger points.

Referring now to the drawings in which like numerals represent the same or similar elements and initially to FIG. 1, a block/flow diagram shows one embodiment of a system/method 100 for externalized selection middleware for variability management including illustrative relationships among various components or software modules. System 100 will be described illustratively in accordance with the insurance rate quote example that was begun earlier; however, it is to be understood that the present invention is not limited to this example.

A non-technician employing module 110 may create a schema, e.g., named "rate_quote_selection_schema" specifying that "age" and "state" are to be considered when selecting a logic cell, and that "age" is an integer between 0 and 100, and state must be one of "NY", "NJ", and "CT". The module 110 tools facilitate specification of the schema dimensions, in block 120, named "age" and "state", with types integer and string respectively, and with valid values (0-100) and ("NY", "NJ", "CT") respectively.

With a schema in place, tools to create an instance, in module 130, can be employed by non-technicians to populate selection criteria in block 140. Based upon a chosen schema, and chosen desirability for completeness checking, a non-technician can specify one or more selections.

Continuing from the described example schema immediately above, a non-technician may choose the "rate_quote_selection_schema" as the constraints for specifying an instance called "rate_quote_selection_instance". That is, the instance populated in block 140 should comply with the constraints included in the associated schema definition in block 120.

Tools to create an instance (in block 130) can be employed by non-technicians to define the values for the dimensions of a selection in block 140. Such tools may comprise, for example, a graphical user interface (GUI) that provides pull down menus or similar well-known mechanisms for specifying an "age" and a "state" from a list of possible choices as the selection criteria dimensions complying with "rate_quote_selection_schema". For example, a user employing module 130 wishing to specify an instance may be given a pull down menu for "age" that comprises a starting value, an ending value, and a range indicator. The non-technician may choose 0 for starting value, 49 for ending value, and true for range indicator.

Since a populated instance must comply with its associated schema, an attempt by a non-technician to specify 200 for ending value for age, or attempting to specify "FL" as state would be disallowed by the tools when creating or updating the example "rate_quote selection_instance".

Module 150 is employed to transform the populated instance into a deployed and usable instance. That is, the "rate_quote selection_instance" is transformed from a user-oriented vocabulary of selections into runtime artifacts.

These middleware components are employed to formulate and administer an application utilizing externalized selection criteria entered by user, programmer or other software components. The multi-dimensional selection administration module 110 facilitates the definition of a selection criteria schema. For example, the selection administration module 110 may include a text editor, a generic Unified Modeling Language (UML) editor, or a customized editor or program applied to a target environment. Module 110 is preferably employed to perform lifecycle and persistence management operations on multi-dimensional selection definition module 120 to produce the selection criteria schema.

The externalized selection criteria restrict instances to use "simple" types (although complex types may be employed as well) for ease of understanding and representability within a type-constrained persistent data storage implementation, such as a database.

For example, "simple" types allowable in the schema may include string representations of numbers (single values or ranges), dates (single values or ranges), and text strings, all includable within a single database type (e.g., VARCHAR type). This is explained further with reference to FIG. 5 below.

The multi-dimensional instance administration module 130 facilitates the definition of selection criteria according to a selection criteria schema. For example, the multi-dimensional instance administration module 130 may be as simple as a text editor, an Eclipse Modeling Framework™ (EMF) generated editor, or another program customized for the target environment. Module 130 is used to perform the lifecycle and persistence management operations on multi-dimensional selection instance elements to populate a selection criteria set 140 and to perform the lifecycle operations on multi-dimensional selection instance elements for deployment and use 150.

Persistent storage systems may include a database, an Enterprise Java Bean (EJB), extensible Markup Language (XML), XML Metadata Interchange (XMI), a standards-based persistence mechanism, and a combination thereof. The selection mechanism may employ one or more of the following: a (Structured Query Language) SQL query, an (Enterprise Java Bean Query Language) EJBQL query, an XML query, an XMI query, a standards based query, and a combination thereof to interrogate externalized data to formulate a conjunction that results in identification of the logical operation.

It is to be understood that a logic operation is broadly defined and for purposes of this disclosure may include logic operation implementations and/or algorithms. The logical operation may employ simple data types, complex data types, and/or a combination thereof.

Figure 2:
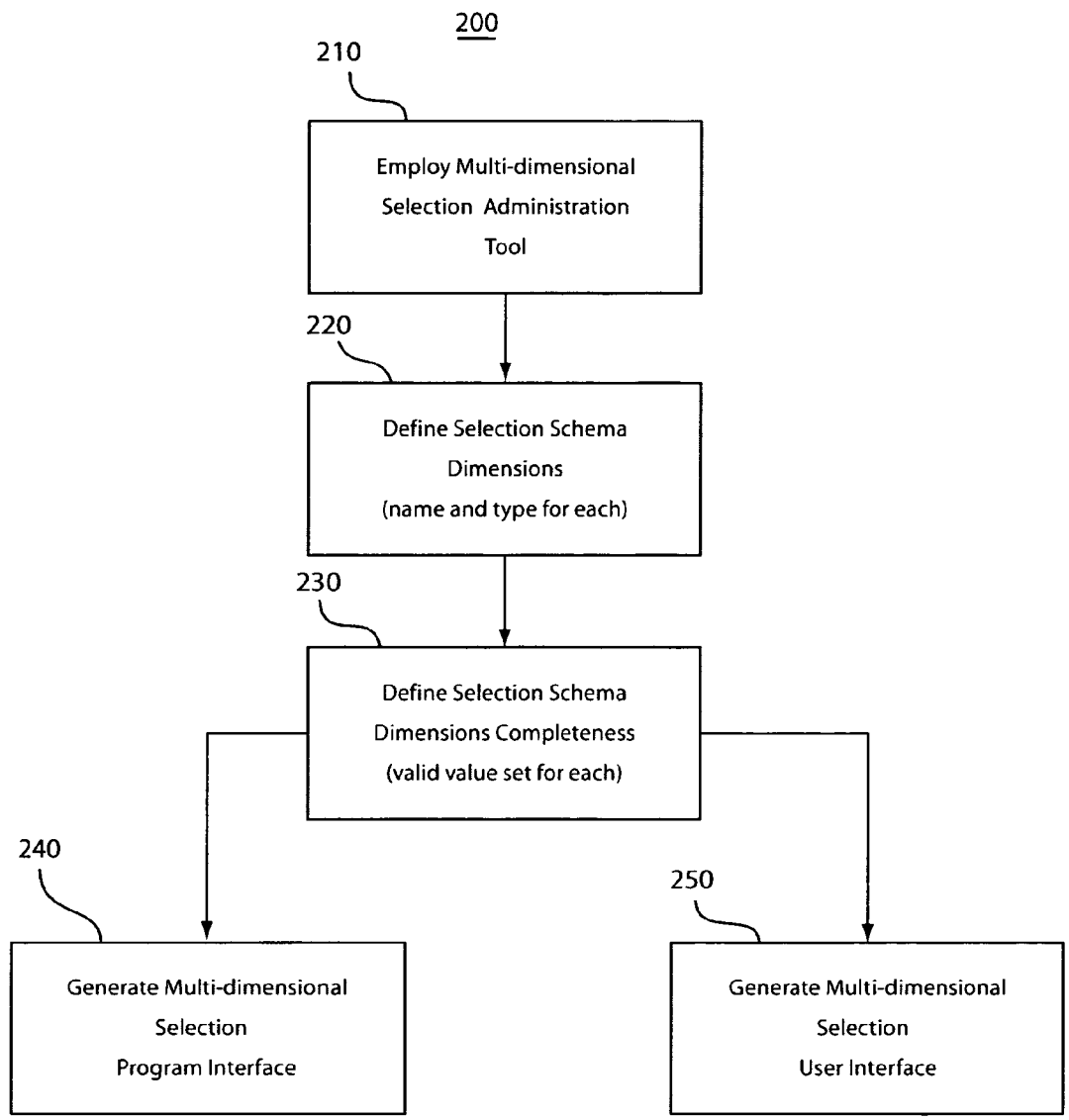
FIG. 2 is a block/flow diagram showing multi-dimensional schema definition and interface generation according to one embodiment of the present invention.

Referring to FIG. 2, a flow diagram shows one embodiment of a multi-dimensional schema definition and interface generation module 200. Module 200 employs a multi-dimensional selection administration tool in block 210. In block 220, dimensions in accordance with a selection schema are defined. For example, names and types of dimensions are determined. In block 230, dimension completeness is defined/determined for the selection schema. For example, valid values and ranges are specified. A multi-dimensional selection program interface 240 is generated for the given application, and/or a multi-dimensional selection user interface 250 is generated for the given application. One or both of these interfaces are employed to provide program/programmer/user input and output capabilities.

The selection administration tool 210 is employed to define selection schema definitions in block 220. Each definition may be comprised of an operation, one or more dimensions, and one or more functions. For example, an operation may include "CalculateLifeInsuranceRate", and functions may include "RateCalculatorVersion1", "RateCalculatorVersion2", "RateCalculatorVersion2NYOnly". Each dimension preferably includes a name and type. For example, one dimension may be named "date" having type "date-range". In conjunction, the selection administration tool 210 is employed to define the selection schema dimensions completeness in block 230. A completeness set, or a valid values set (when completeness is not required), is associable with each dimension. For example, the completeness set for one dimension of type "date-range" may include "Jan. 1, 2003-Dec. 31, 2003".

Once the dimensions and completeness or valid values sets have been defined, the selection administration tool 210 is employed to generate a multi-dimensional selection program interface in module 240 and generate a multi-dimensional selection user interface in module 250. For example, a generated program interface for a three dimensional selection definition specified as age, state, and date with associated types of integer, string, and date-range may produce a trigger code signature such as "evaluate(String operation, Integer age, String state, Date beginDate, Date endDate)".

A generated user interface from module 250 may include a generic editor customized to require dimensionally complete sets for each selection instance defined. For example, if, for completeness, the required age range was 0-100, and the required states were NY and NJ, and the required date-range was Jan. 1, 2003-Dec. 31, 2003, then the generated editor or "wizard" would not permit a finish operation to occur unless the combination of all selection instances for one definition covered the entire multi-dimensional space.

Continuing this example, an incomplete selection instance would be "0-100, NY, Jan. 1, 2003-Dec. 31, 2003", since "0-100, NJ, Jan. 1, 2003-Dec. 31, 2003" is not covered. To be complete, the following could be added: "0-49, NJ, Jan. 1, 2003-Dec. 31, 2003", "50-100, NJ, Jan. 1, 2003-Jun. 30, 2003", "50-100, NJ, Jul. 1, 2003-Dec. 31, 2003", since the combination of these three dimension tuples for "NJ" together with the tuple for "NY" cover the required dimension space.

Figure 3:
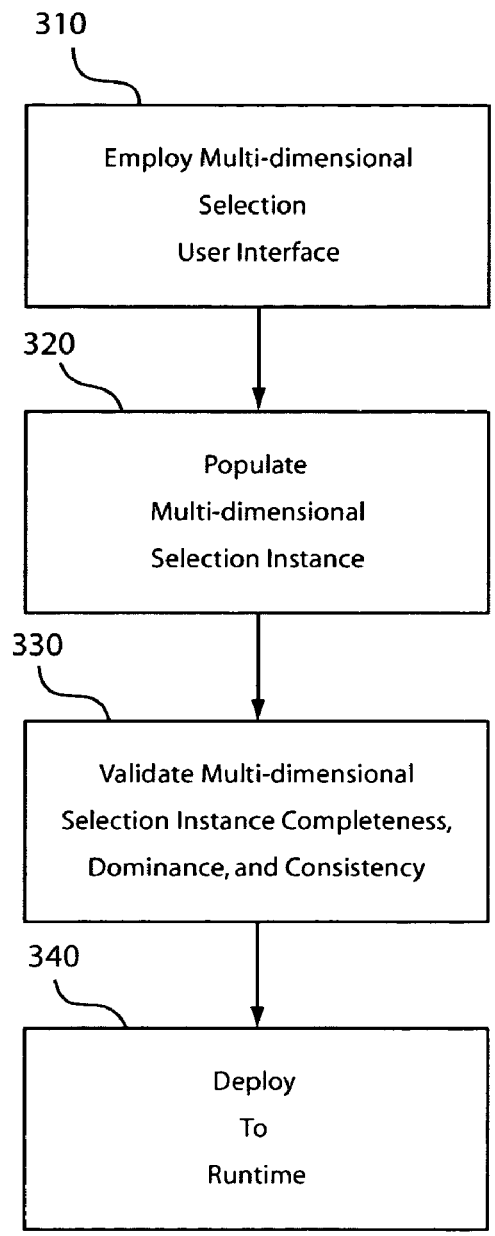
FIG. 3 is a block/flow diagram showing population and validation of selection criteria according to one embodiment of the present invention.

Referring now to FIG. 3, a block/flow diagram shows one embodiment of multi-dimensional selection criteria instance population and validation system/method 300. System 300 employs a multi-dimensional selection user interface in block 310 to populate a multi-dimensional selection instance in block 320. In block 330', multi-dimensional selection instances are validated for completeness, dominance, and consistency, and in block 340, the instance is deployed to runtime.

The selection user interface 310, produced by the generate selection user interface in block 250 (FIG. 2), is employed to define a selection instance. The selection instance is iteratively populated in block 320 by permitting a user to specify values for dimension tuples or other dimensions related to the particular instance. This may be performed, for example, by employing a graphical user interface presented to a user on a computer display, and in one embodiment may include populating one or more tables.

Continuing the running example, a user may enter one tuple for the dimensions such as "0-100, CT, Jan. 1, 2003-Dec. 31, 2003". Continuously or when a finish action is selected, checks are made to validate completeness, dominance, and consistency in block 330. If completeness required that the age dimension cover "1-100" then the specification of "0-50, MA, Jan. 1, 2003-Dec. 31, 2003" as the only entry for state "MA' would be flagged as incomplete, since the age range "51-100" is not covered. If an additional specification of "50-100, MA, Jan. 1, 2003-Dec. 31, 2003" was made, then a flag would be posted for inconsistency since age "50" overlaps tuples. If an additional specification of "10-20, MA, Jun. 1, 2003-Jun. 30, 2003" was made, then a flag would be posted for dominance, since this tuple is entirely covered by the previously specified "0-50, MA, Jan. 1, 2003-Dec. 31, 2003" tuple. Once all flags have been remedied, the resulting selection instance data can be deployed in block 340 to a runtime environment.

Figure 4:
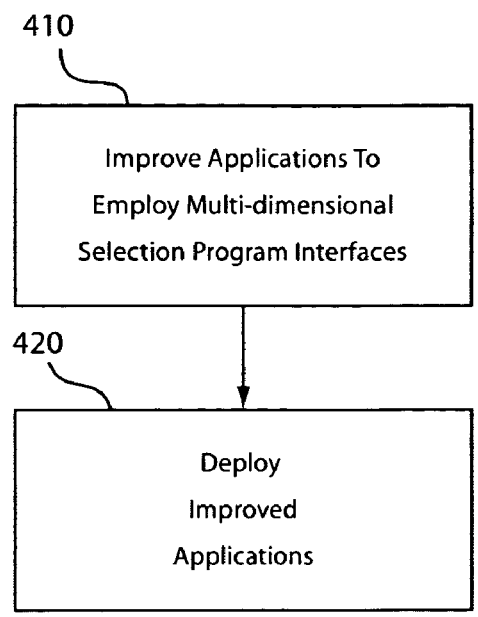
FIG. 4 is a block/flow diagram showing application employment of multi-dimensional selection program interfaces and deployment according to one embodiment of the present invention.

Referring now to FIG. 4, a block/flow diagram shows an embodiment for a module 400, which improves existing applications by applying/employing multi-dimensional selection program interfaces in accordance with the invention. Applications, which employ multi-dimensional program interfaces (also known as triggers), are improved by employing the selection program interfaces described with reference to FIGS. 2 and 3. The improved applications are then deployed in block 420.

An improved application is outfitted in block 410 with requests for service by embedding generated multi-dimensional program interfaces (240 of FIG. 2) that, at runtime, gather the required selection and evaluation criteria, employ the selection mechanism to pick an executable logic cell, employ the logic cell according to the evaluation criteria, and gather and return any results. Employment of the selection mechanism causes references to the externalized selection tuples previously created (see FIG. 3) to be made to determine the logic cell utilized for each evaluation request. Applications so equipped are deployed in block 420 to a runtime environment for use.

Figure 5:
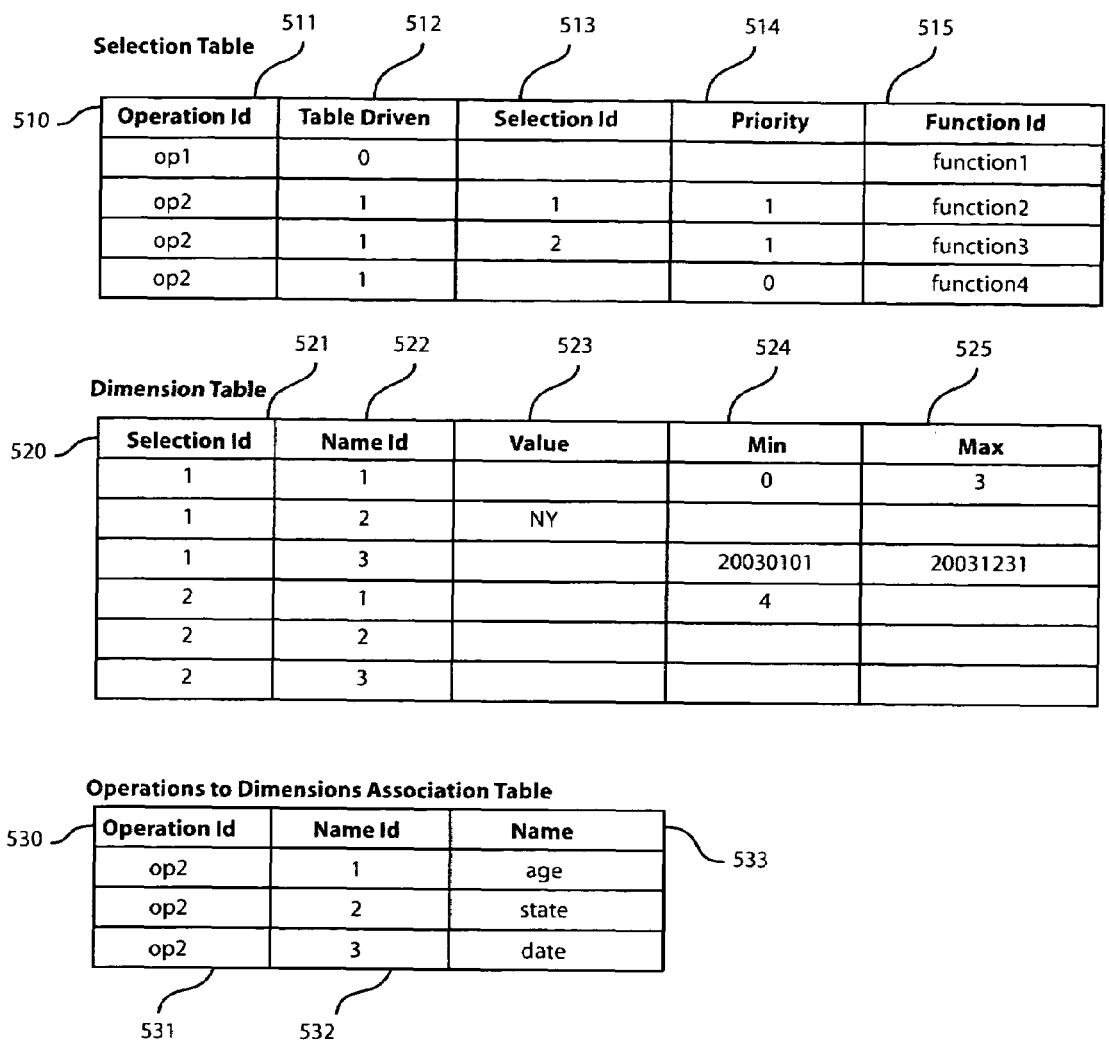
FIG. 5 is a diagram showing a 3-table implementation example according to one embodiment of the present invention.

Referring now to FIG. 5, a block/flow diagram shows an illustrative embodiment of a 3-table implementation 500. The tables represent one way in which the present invention may be implemented; however other suitable techniques may be employed (e.g., XML, XMI) in accordance with the present invention. The implementation 500 comprises a selection table 510, a dimension table 520 and an operations to dimensions association table 530. The tables in implementation 500 are an illustrative implementation generated for population. In a particular instance, the information included in the tables of 500 may have a different appearance or setup based upon the schema and programming environment.

The tables 510, 520 and 530 are preferably manipulated by employing the generated multi-dimensional user interface (250 of FIG. 2). The tables are preferably stored in a database, but may be equivalently kept by any other suitable medium or form, e.g., data storage. The tables of implementation 500 may provide the basis for selection by a reusable code (e.g., logic) module. Using the selection criteria in tables 500 to select a logic operation may be referred to generally as mapping.

The selection table 510 comprises columns for Operation Id 511, Table Driven indicator 512, Selection Id 513, Priority 514, and Function Id 515. An Operation Id column entry identifies the logical operation to be performed. Example operations shown are op1 and op2. As described above, another example operation may include "CalculateLifeInsuranceRate". An Operation Id is specified by improved applications to indicate a desired operation. For example, this may be in the context of running an existing application where the desired operation is needed.

A Table Driven indicator column entry specifies whether or not the selection dimension table 520 and operations to dimensions association table 530 are employed for the associated Operation Id. The example shows that op1 does not employ the dimension table 520 and association table 530, while op2 does. For the former, the corresponding function is called without selection criteria, thus function "function1" is called as indicated in Function Id 515. In the latter case, which function to call is decided according to the selection criteria as discussed below.

The selection table's 510 Selection Id column entry associates a corresponding Function Id column entry with a particular selection criteria tuple from the dimension table 520. The example shows that op1 is associated with function1 without regard to selection criteria in the dimension table 520; and that op2 is associated with function2, function3, or function4 depending on the selection criteria in the dimension table 520.

A priority entry is part of each tuple in the selection table 510. The priority value (514) is used in the event that more than one dimension table 520 match is made. This can occur when the completeness, dominance, and/or consistency checking is disabled.

The operations to dimensions association table 530 comprises columns for Operation Id 531, Name Id 532, and Name 533. It serves at least two purposes. First, table 530 specifies the number of dimensions for a selection and provides unique identifiers for the dimensions, and second, the table 530 specifies the names of the associated dimensions.

In the example, the number of dimensions for Operation Id op2 is 3, since op2 appears 3 times in the Operation Id column 511. The associated dimensions are 1, 2, and 3 having Names "age", "state", and "date" respectively. Thus, the selection criteria for logical operation op2 is comprised of 3 parameters known as "age", "state", and "date".

The dimension table 520 comprises columns for Selection Id 521, Name Id 522, Value 523, Min (minimum) 524, and Max (maximum) 525. A Selection Id column entry, in conjunction with the related Operation Id entry from the selection table 510, and the related Operation Id entry from the operations to dimensions association table 530 identifies selection criteria for one parameter of possibly many parameters used for selectivity for one operation. A Value column entry is mutually exclusive with entries for Min and/or Max column entries for each row. A Value column entry specifies the exact value expected for an evaluated parameter. A Min column entry specifies the non-inclusive minimum value expected for an evaluated parameter (e.g., parameter value<minimum). A Max column entry specifies the non-inclusive maximum value expected for an evaluated parameter (e.g., parameter value>maximum).

To achieve an inclusive range, two or three rows may be specified: one row for the non-inclusive range, one for the lower bound exact match, and one for the upper bound exact match. For example, adding tuple (1,1,3,) to the example dimension table 520 would cover parameter "age" equal to three for op2 corresponding to function2.

Note that transformations needed to conform to the format of the dimension table 520 are done by the multi-dimensional selection user interface (e.g., 250 in FIG. 2 and 310 of FIG. 3). When using Min or Max, if the other is not specified, then the corresponding value for the other is unconstrained. In the example, for op2 corresponding to function3, the minimum value for the "age" parameter is 4, while the maximum value is unbounded.

Using the example tables of implementation 500, suppose that an improved application requests Operation Id op2, and passes selection parameters age=2, state=NY, and date=20030627. Since the age parameter meets the age criteria 0<age<3, and the state parameter meets the state criteria NY, and the date parameter meets the date criteria 20030101<20030627<20031231 for Selection Id=1 (table 520) then the function to be employed is function2 (table 510).

Suppose another request for Operation Id op2 is made with selection parameters age=2, state=CT, and date=20031104. The age criteria for op2/function2 is met as before, but the state criteria is not. The age criteria for op2/function 3 is not met since the age parameter 2 is less than the minimum 4. There are no restrictions on parameters values for op2/function4, thus function4 is selected.

When the value, min, and max entries for a row are empty, this indicates that any value specified is acceptable. Thus, in the earlier example for Selection Id 2, any parameter values specified for state and date are allowed for a match to occur, but the minimum for age should also be met in this case. When more than one selection criteria is met, then the one having the highest priority is employed. In the above example where the selection parameters were age=2, state=NY, and date=20030627, both op2/function2 and op2/function4 are possible choices, but op2/function2 is employed since its priority is 1 which is greater than the op2/function4 priority of 0.

The selection criteria are not necessarily intermingled with the function evaluation criteria. For example, the selection criteria may include age, state, and date as in this example, but the function evaluation criteria may include income level and marital status. The selection criteria can be completely separate from the function evaluation criteria, or can partially or completely overlap the function evaluation criteria depending on the circumstances.

Referring now to FIG. 6, a trigger mapping implementation 600 is illustratively shown. The implementation 600 comprises a trigger mapping table 610. Trigger mapping table 610 provides an optional level of indirection between the improved application request for service (trigger) and the service (as previously provided without the improvement of the present invention). A Trigger Id 611 is mapped to an Operation Id 612, for example. Instead of directly specifying a desired operation, an improved application may instead simply specify its own identity when employing a selection program interface (module 240 of FIG. 2), which in turn employs a trigger mapping table to determine which operation to invoke.

The selected implementation of the mapped-to operation (e.g., function employed) is then determined in the usual way as described above with respect to FIG. 5. For example, an improved application may specify Trigger Id t2 together with selection parameters 3, NY, and 20031104 for age, state and date, respectively. Since Trigger Id t2 is mapped to Operation op2, and since op2 (referring now to FIG. 5) is table driven (510), and the selection criteria for age, state, and date match Selection Id 2 (520, 530) as the highest priority match, then the corresponding function function2 is invoked.

Figure 7:
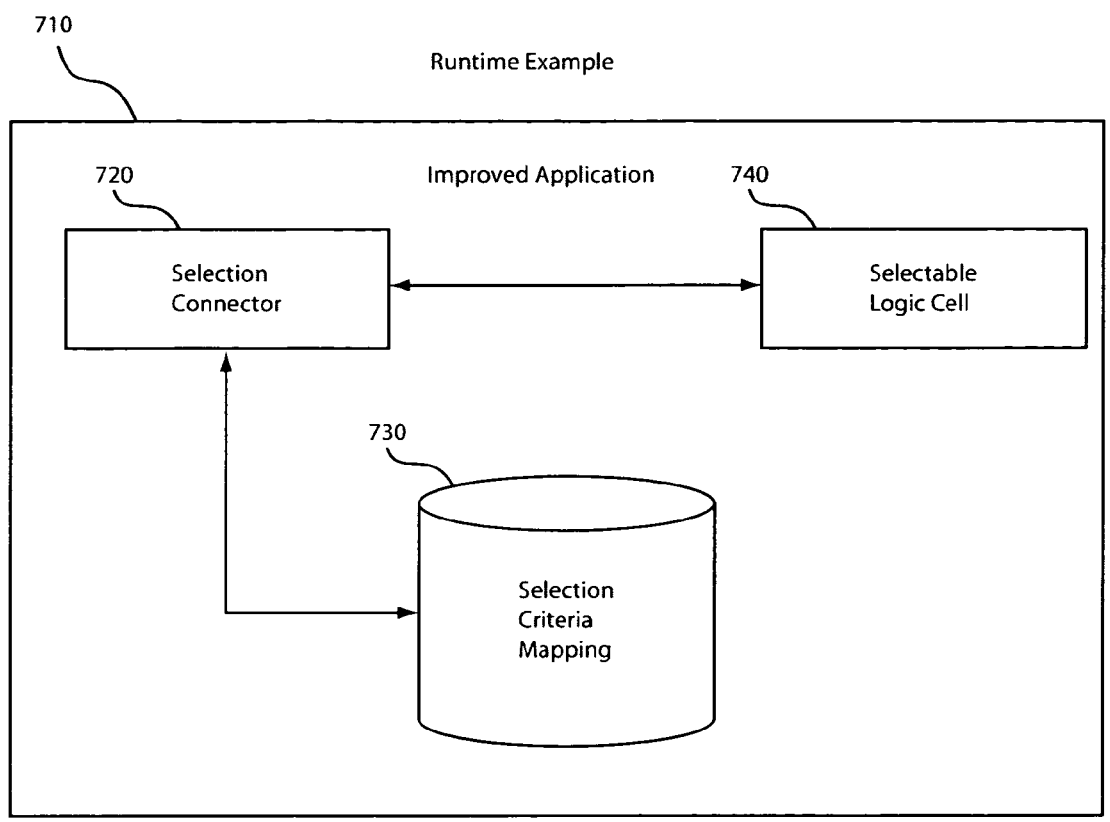
FIG. 7 is a diagram showing a runtime example where an improved application employs externalized selection middleware for variability management according to one embodiment of the present invention.

Referring now to FIG. 7, a block/flow diagram shows one embodiment of a deployed runtime example 700. An improved application 710 employs a selection connector 720 using selection criteria mapping 730 to link with a selectable logic cell 740.

A deployed improved application 710 includes a selection connector 720 comprised of a multi-dimensional selection program interface (e.g., generated by module 240 in FIG. 2). During runtime, the selection connector references the selection criteria mapping (730) comprised of selection, dimension, operations to dimension association (510, 520, 530 of FIG. 5), and perhaps trigger mapping (610 of FIG. 6) tables to determine the function (e.g., selectable logic cell 740) to employ based upon the invocation parameter types and associated values which are employed. The determined selectable logic cell 740 is then called with evaluation parameters, if any, to perform the desired task.

Having described preferred embodiments of a system and method for externalized selection middleware for variability management (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for dynamically selecting logical operations using external criteria, comprising:
    defining a selection criteria set having parameters including dimensions and valid values, wherein the selection criteria set includes a plurality of different arrangements and values of the parameters;
    maintaining the selection criteria set and collections of instances thereof persistently; and
    providing a trigger at runtime to query the persistently maintained instances to automatically select a logic operation to employ based upon a context of the query.

2. The method as recited in claim 1, wherein the selection criteria set includes dimensions of a selection context and the valid values for each dimension.

3. The method as recited in claim 1, wherein the selection criteria set includes one of a range, an enumeration, and a combination thereof.

4. The method as recited in claim 1, wherein the selection criteria set includes simple data types, and the logical operation employs one of simple data types, complex data types, and a combination thereof.

5. The method as recited in claim 4, wherein the selection criteria set and the logical operation employ one of common inputs, unrelated inputs, and a combination thereof.

6. The method as recited in claim 4, wherein the selection criteria set and the logical operation employ one of common outputs, unrelated outputs and a combination thereof.

7. The method as recited in claim 1, wherein the step of defining the selection criteria includes generating an application programming interface to permit entry of the parameters.

8. The method as recited in claim 7, wherein the application programming interface presents a tabular-oriented user interface.

9. The method as recited in claim 8, wherein the tabular-oriented user interface is geared towards non-programmers.

10. The method as recited in claim 1, wherein the step of maintaining includes employing one of a database, an Enterprise Java Bean (EJB), eXtensible Markup Language (XML), XML Metadata Interchange (XMI), a standards-based persistence mechanism, and a combination thereof.

11. The method of claim 1, further comprising the step of querying persistent storage by employing one of a Structured Query Language (SQL) query, an Enterprise Java Bean Query Language (EJBQL) query, an eXtensible Markup Language (XML) query, XML Metadata Interchange (XMI) query, a standards based query, and a combination thereof to interrogate externalized data to formulate a conjunction that results in identification of the logical operation.

12. The method as recited in claim 1, further comprising the step of generating three tables to map the selection criteria to the logic operation.

13. The method as recited in claim 1, wherein the context of the query considers an operation identity, a function identity, including parameter names and types and selection parameters including names of, types of and constraints over the selection parameters.

14. The method as recited in claim 1, wherein the selection criteria set is stored in tabular form.

15. The method as recited in claim 1, wherein a collection of selection criteria set instances comprises a complete and unambiguous conjunction of valid values for each selection dimension for a logical operation.

16. A program storage device readable by machine, tangibly embodying a program of instructions executable by the machine to perform method steps for dynamically selecting logical operations using external criteria, the method steps comprising:
    defining a selection criteria set having parameters including dimensions and valid values, wherein the selection criteria set includes a plurality of different arrangements and values of the parameters;
    maintaining the selection criteria set and collections of instances thereof persistently; and
    providing a trigger at runtime to query the persistently maintained instances to automatically select a logic operation to employ based upon a context of the query.

17. A method for dynamically selecting and triggering a function utilizing externalized criteria, comprising the steps of:
    defining a schema prescribing a selection criteria set including evaluation parameter names and types;
    deriving a tool from the schema that facilitates persistently defining and maintaining externalized selection criteria set instances;
    deploying an improved application incorporating at least one trigger mechanism;
    executing the at least one trigger mechanism to dynamically select a function according to a runtime context; and
    executing the selected function in accordance with runtime instances of corresponding evaluation parameters.

18. The method as recited in claim 17, further comprising the step of creating the at least one trigger mechanism based upon evaluation parameters and an operation identity.

19. The method as recited in claim 17, further comprising the step of employing the tool to produce at least one externalized criteria set instance and the at least one trigger mechanism.

20. The method as recited in claim 17, wherein the selection criteria set instances include table rows.

21. The method as recited in claim 17, wherein the selection criteria set includes one of a range, an enumeration, and a combination thereof.

22. The method as recited in claim 17, wherein the selection criteria set includes simple data types, and the function employs one of simple data types, complex data types, and a combination thereof.

23. The method as recited in claim 17, wherein the selection criteria set includes an operation identity and a corresponding function identity, including the evaluation parameter names and types.

24. The method as recited in claim 23, wherein the runtime context considers an operation identity, a function identity, including parameter names and types and selection parameters including names of, types of and constraints over the selection parameters defined for the selection criteria set.

25. The method as recited in claim 17, wherein the step of defining a schema includes populating a dimension table with parameter values and ranges.

26. The method as recited in claim 25, further comprising the step of providing an operations-to-dimensions table to correlate operations to parameter values and ranges.

27. The method as recited in claim 17, wherein the tool is geared towards non-programmers.

28. The method as recited in claim 17, wherein the step of persistently defining and maintaining includes employing one of a database, an Enterprise Java Bean (EJB), eXtensible Markup Language (XML), XML Metadata Interchange (XMI), a standards-based persistence mechanism, and a combination thereof.

29. The method as recited in claim 17, wherein the dynamic selecting employs one of a Structured Query Language (SQL) query, an Enterprise Java Bean Query Language (EJBQL) query, an eXtensible Markup Language (XML) query, XML Metadata Interchange (XMI) query, a standards based query, and a combination thereof to interrogate externalized data to formulate a conjunction that results in identification of the function.

30. The method as recited in claim 17, wherein the step of executing the at least one trigger mechanism includes providing three tables to map the selection criteria to the logic operation.

31. A program storage device readable by machine, tangibly embodying a program of instructions executable by the machine to perform method steps for dynamically selecting and triggering a function utilizing external criteria, the method steps comprising:
    defining a schema prescribing a selection criteria set including evaluation parameter names and types;
    deriving a tool from the schema that facilitates persistently defining and maintaining externalized selection criteria set instances;
    deploying an improved application incorporating at least one trigger mechanism;
    executing the at least one trigger mechanism to dynamically select a function according to a runtime context; and
    executing the selected function in accordance with runtime instances of corresponding evaluation parameters.

32. A method for dynamically selecting and triggering a function utilizing externalized criteria, comprising the steps of:
    defining a schema prescribing a selection criteria set comprising:
        an operation identity;
        a corresponding function identity, including evaluation parameter names and types; and
        selection parameters, including names of, types of, and constraints over the selection parameters;
    deriving a tool from the schema that facilitates:
        persistently defining and maintaining externalized selection criteria set instances; and
        creating trigger mechanism instances based upon evaluation parameters and operation identity;
    employing the tool to produce at least one externalized criteria set instance and at least one trigger mechanism;
    deploying an improved application incorporating at least one trigger mechanism;
    executing a trigger mechanism to dynamically select a function according to runtime context comprising:
        a desired operation identity instance; and
        corresponding selection parameters instances; and
    executing the selected function in accordance with runtime instances of corresponding evaluation parameters.

33. The method as recited in claim 32, wherein a collection of selection criteria set instances comprises a complete and unambiguous conjunction of valid values for each selection dimension for an operation identity.

34. A system for dynamically providing a programming/user interface for selecting logical operations using user provided external criteria, comprising:
    a program application for triggering an interactive procedure for a user, the program application and interactive procedure being included on one or more computer readable media, wherein the computer readable media is executable by a computer;
    the interactive procedure including an interface, dynamically generated, which is employed to define a selection criteria set having parameters including dimensions and valid values, wherein the selection criteria set may include a plurality of different arrangements and values of the parameters; and
    a logic cell having reusable code stored on computer readable media for logic operations, the logic cell dynamically selecting a logic operation based upon a runtime context, the runtime context being based upon an operation identity instance and a selection parameter instance which employ the parameters defined in the selection criteria set.

35. The system as recited in claim 34, wherein the selection criteria set includes dimensions of a selection context and the valid values for each dimension.

36. The system as recited in claim 34, wherein the selection criteria set includes one of a range, an enumeration, and a combination thereof.

37. The system as recited in claim 34, wherein the selection criteria set includes simple data types, and the logical operation employs one of simple data types, complex data types, and a combination thereof.

38. The system as recited in claim 34, wherein the interface includes one or more tables.

39. The system as recited in claim 38, wherein one of the tables assigns and prioritizes functions to operations.

40. The system as recited in claim 38, wherein one of the tables includes a dimension table, which is populated with parameter values and ranges.

41. The system as recited in claim 38, wherein one of the tables includes an operations to dimensions table to correlate operations to parameter values and ranges.

42. The system as recited in claim 34, wherein the interactive procedure is geared towards non-programmers.

43. The system as recited in claim 34, wherein the selection criteria parameters are drawn from information persistently maintained by a persistence mechanism.

44. The system as recited in claim 34, wherein the dynamic selecting employs one of a Structured Query Language (SQL) query, an Enterprise Java Bean Query Language (EJBQL) query, an eXtensible Markup Language (XML) query, XML Metadata Interchange (XMI) query, a standards based query, and a combination thereof to interrogate externalized data to formulate a conjunction that results in identification of the logical operation.

45. The system as recited in claim 34, wherein The interface includes three tables to map the selection criteria set to the logic operation.

\* \* \* \* \*